United States Patent [19]

Shimp et al.

[11] 4,141,871

[45] Feb. 27, 1979

[54] AQUEOUS DISPERSIONS OF POLYHYDROXY POLYETHER RESINS AS COATING COMPOSITIONS FOR METALLIC SUBSTRATES

[75] Inventors: David A. Shimp, Prospect, Ky.; Robert B. Mitzel, Springfield, Ill.

[73] Assignee: Celanese Polymer Specialties Company, Louisville, Ky.

[21] Appl. No.: 825,366

[22] Filed: Aug. 17, 1977

[51] Int. Cl.$^2$ .................. C08L 61/28; C08L 61/10
[52] U.S. Cl. .................. 260/29.4 R; 260/29.2 TN; 260/29.3; 428/418; 428/460
[58] Field of Search .......... 260/29.2 EP, 29.2 TN, 260/29.4 R, 29.3, 33.4 EP

[56] References Cited

U.S. PATENT DOCUMENTS

| | | | |
|---|---|---|---|
| 4,043,963 | 8/1977 | Anderson | 260/29.4 R |
| 4,059,550 | 11/1977 | Shimp | 260/29.4 R |

*Primary Examiner*—Theodore E. Pertilla
*Attorney, Agent, or Firm*—Herbert P. Price; K. A. Genoni; T. J. Morgan

[57] ABSTRACT

Coating compositions are prepared from aqueous dispersions of polyhydroxy polyether resins and aminoplast or phenolplast resins or blocked polyisocyanates containing as a diluent an aqueous emulsion of a water immiscible alcohol. The coating compositions are particularly useful as can coatings.

12 Claims, No Drawings

AQUEOUS DISPERSIONS OF POLYHYDROXY POLYETHER RESINS AS COATING COMPOSITIONS FOR METALLIC SUBSTRATES

BACKGROUND OF THE INVENTION

The field to which this invention pertains is heat curable coating compositions made from aqueous dispersions of epoxy resins or polyether resins derived therefrom and crosslinking agents, i.e., aminoplast or phenolplast resins or blocked polyisocyanates.

Metal coating compositions based on organic solvent solutions of polyhydroxy polyether resins have been used successfully for a number of years. Such coating compositions have been particularly useful for the interiors of food and beverage containers.

Due to the increasing problems with air pollution, considerable effort is being expended to convert organic solvent containing coating compositions to water based systems, i.e., coating systems based on emulsions and dispersions of film forming resins in water. A serious problem in the use of such aqueous emulsions or dispersions is the inability of the resin to properly wet the metal substrate and to form a continuous coating. In many instances, can coating compositions based on aqueous dispersions of polyhydroxy polyether resins, when spray applied in the manner of conventional solvent based coating compositions, do not form protective continuous coatings. Numerous small voids in the coatings appear as craters or as unwet areas under magnification. Such voids are the cause of objectionable turbidity in beer packaged in aluminum cans, corrosion of steel cans and corrosion of aluminum cans containing carbonated soft drinks.

SUMMARY OF THE INVENTION

This invention relates to heat curable coating compositions made from aqueous dispersions of complex polyhydroxy polyether resins. In particular this invention pertains to heat curable coating compositions made from aqueous dispersions of complex polyhydroxy polyether resins and aminoplast or phenolplast resins or blocked polyisocyanates. More particularly this invention relates to such coating compositions which contain an aqueous emulsion of butanol as a diluent.

The heat curable coating compositions of this invention are made from aqueous dispersions of polyhydroxy polyether resins having a melting point of at least about 50° C. in admixture with an aminoplast or phenolplast resin or a blocked polyisocyanate. A portion of the volatile component of the coating composition contains an emulsion of a water immiscible alcohol, a butanol, wherein the alcohol is present in the amount of about 5 to about 30 weight percent of the total volatiles. The coating compositions of this invention have surface tensions of about 26 to about 28 dynes per centimeter at 25° C.

The compositions of this invention have much lower surface tensions than compositions which contain no water immiscible alcohol and wet the surfaces of metals much more effectively. Coatings made from the compositions of this invention are continuous and free of voids and craters. When used as the interior coating for beverage cans, the cans are protected from corrosion and the beverages from contamination.

The addition of the water immiscible alcohol to the dispersion as an emulsion in water prevents coagulation of the dispersion and the formation of grit.

DESCRIPTION OF THE INVENTION

The complex polyhydroxy polyether resins used in this invention contain alternating aromatic and glyceryl nuclei linked through ether oxygens. These resins can be terminated with epoxy (glycidyl) groups, phenolic groups, hydroxyalkyl groups, alkyl or aryl ester groups and alkyl or aryl ether groups. Such resins useful in this invention are those which have a Durrans melting point of at least about 50° C. Preferably the melting point of the resin is about 50° C. to about 150° C., and most preferably about 80° C. to about 135° C.

The complex polyhydroxy polyether resins useful in this invention are derivatives of epihalohydrins and polyhydric phenols reacted in various ratios and with or without modifying compounds. The epihalohydrins are epichlorohydrin, epibromohydrin and epiiodohydrin with epichlorohydrin being preferred. The polyhydric phenols include resorcinol, hydroquinone, phloroglucinol, p,p'-dihydroxydiphenyl propane (Bisphenol A), 4,4'-dihydroxy benzophenone, 4,4'-dihydroxy biphenyl, p,p'-dihydroxydiphenyl sulfone, p,p',p''-trihydroxytriphenyl methane, novolac resins, and the like. The most preferred dihydric phenol is p,p'-dihydroxydiphenyl propane or Bisphenol A as it is commonly called.

The complex polyhydroxy polyether resins which are terminated with epoxy groups are made by reacting a molar excess of epihalohydrin with a dihydric phenol as described in U.S. Pat. No. 2,615,007 or a molar excess of a diglycidyl ether of a dihydric phenol with additional dihydric phenol as described in U.S. Pat. No. 2,615,008. The molecular weight, melting point and epoxide equivalents weight of such resins can be varied over a wide range by varying the ratio of epihalohydrin or diepoxide to dihydric phenol as is well known in the art. Phenolic terminated complex polyhydroxy polyether resins are made by reacting a molar excess of dihydric phenol with the epihalohydrin or diepoxide as described in U.S. Pat. No. 2,668,805.

Complex polyhydroxy polyether resins containing epoxide termination can also be reacted with a monocarboxylic acid to produce an ester terminated polyhydroxy polyether. Monocarboxylic acids containing 1 to 24 carbon atoms, such as formic acid, acetic acid, propionic acid, 2-ethylhexoic acid, oleic acid, lauric acid, palmitic acid, stearic acid, lignoceric acid and the like, can be used. Generally the amount of acid used will be equivalent to the epoxide content of the resin and the reaction is conducted under such conditions as to bring about carboxy-epoxy reaction but not carboxy-hydroxy reaction. The complex polyhydroxy polyether resins containing epoxide termination can also be ether terminated by reacting the epoxide groups with monohydric phenols and monohydric alcohols under conditions well known in the art.

Hydroxyalkyl ether terminated complex polyhydroxy polyether resins can be made by the procedure described in U.S. Pat. No. 2,558,949 wherein a dihydric phenol is reacted with an epihalohydrin and a monochlorohydrin. Such terminated products can also be obtained by a two step process wherein a phenolic terminated polyhydroxy polyether resin is first made followed by reaction with a monochlorohydrin or a monoepoxide, examples of which include ethylene chlorohydrin, glyceryl monochlorohydrin, propylene chlorohydrin, ethylene oxide, propylene oxide, glycidol, phenyl glycidyl ether, butyl glycidyl ether and the like.

Ester terminated polyhydroxy polyether resins can also be made by reacting a diepoxide, a diphenol and a monocarboxylic acid in the ratio of n + 1 mols of diepoxide, n mols of diphenol and 2 mols of monocarboxylic acid as described in U.S. Pat. No. 3,247,136. By modifying the above procedure using n mols of diepoxide, n mols of diphenol and 1 mol of monocarboxylic acid, a polyhydroxy polyether resin containing phenolic termination and ester termination can be made.

The preferred polyhydroxy polyether resin is a Bisphenol A, epichlorohydrin reaction product containing phenolic termination and having a Durrans melting point of about 80° C. to about 135° C.

The dispersants which are used to make the aqueous dispersions are anionic and nonionic surfactants. Examples of anionic surfactants include sodium and potassium alkyl sulfates, aryl sulfates and alkylaryl sulfates and sulfonates; ethoxylated and sulfonated fatty alcohols, e.g., stearyl alcohol and lauryl alcohol; dialkyl esters of alkali metal sulfosuccinic acid salts, e.g., sodium diamyl sulfosuccinate, sodium dihexyl sulfosuccinate and sodium dioctyl sulfosuccinate; and formaldehyde-naphthalene-sulfonic acid condensation products.

A preferred anionic dispersant for use in this invention is an inorganic or organic base salt of a polymeric carboxylic acid having an acid value of at least about 50 up to about 150 before salting. Preferably the acid value will be in the range of about 65 to about 110. The molecular weight of the dispersant combined with the acid value should be such that the salt of the product is soluble or colloidally dispersible in water, or water with a water miscible cosolvent at the temperatures employed in the dispersion process. Useful molecular weights will vary from about 1000 to about 100,000 and, preferably, from about 20,000 to about 50,000.

The preferred polymeric carboxylic acid to be used in this invention is a copolymer of polymerizable ethylenically unsaturated acids, e.g., acrylic and methacrylic acid, with other monomers copolymerizable therewith, e.g., alkyl acrylates and methacrylates wherein the alkyl group contains 1 to 18 carbon atoms, hydroxyalkyl acrylates and methacrylates, styrene, vinyl toluene, acrylonitrile and the like. A particularly preferred polymeric carboxylic acid is made from about 50 to about 70% by weight ethyl acrylate, about 20 to about 30% by weight styrene and about 10 to about 20% by weight acrylic or methacrylic acid.

To form the dispersant, the polymeric carboxylic acid is salted with an organic or inorganic base, e.g., sodium or potassium hydroxide, ammonium hydroxide, or an amine. Useful amines are those which have amine equivalent weight of less than about 150, and can be primary, secondary, or tertiary. Examples of amines are ethylamine, propylamine, diethylamine, dipropylamine, triethylamine, tributylamine, morpholine, ethanolamine, ethylene diamine, and the like.

Among the nonionic surfactants used in this invention are polyethers, e.g., polyethylene and polypropylene oxides, which include straight and branched chain alkyl and alkylaryl polyethylene glycol ethers, polypropylene glycol ethers and mixed polyethylene/polypropylene glycol ethers. Examples of such nonionic surfactants are the Igepals, which is a trademark of General Aniline and Film Corporation denoting members of a homologous series of alkylphenoxypoly-(ethyleneoxy)ethanols. Other suitable nonionic surfactants are the "Tweens" which is a trademark of Atlas Powder Company denoting polyoxyalkylene derivatives of hexitol (including sorbitans, sorbides, mannitans and mannides) anhydride and partial long chain fatty acid esters, such as polyoxyalkylene derivatives of sorbitan monolaurate, sorbitan monostearate, etc. Particularly preferred nonionic surfactants are the "Pluronics", which is the trademark of Wyandotte Chemicals Corporation denoting condensates of ethylene oxide with a hydrophobic condensate of propylene oxide and propylene glycol. Other nonionic surfactants useful in this invention are adducts of polyoxyethylene glycols and glycidyl polyethers of polyhydric phenols.

The amount of dispersant used in the process of this invention is about 1 to about 25 percent by weight based on the weight of the polyhydroxy polyether resin and, preferably, about 3 to about 10 percent.

Additional components which can be used in preparing the aqueous dispersions used in this invention are protective colloids added in the amounts of about 0.1 to about 5 percent by weight based upon the total solids weight of the dispersion. Examples of useful protective colloids are starch, casein, gelatin, alginates, pectinates, methyl cellulose, hydroxyethyl cellulose, carboxymethyl cellulose, polyvinyl alcohol, sodium or ammonium salts of linear or partially crosslinked acrylic or methacrylic acids, and the like.

The aminoplast and phenolplast resins and the blocked polyisocyanates used to cure the polyhydroxy polyethers can be added during the dispersion process or can be added after the dispersion has been formed. If added during the dispersion process, these resins and blocked polyisocyanates must be nonreactive with the polyhydroxy polyether resin at the processing temperature. Examples of useful aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of aminoplast resins are methylol urea, dimethoxymethylol urea, butylated polymeric urea-formaldehyde resins, hexamethoxymethyl melamine, methylated polymeric melamine-formaldehyde resin and butylated polymeric melamine-formaldehyde resin. Aminoplast resins and their methods of preparation are described in detail in "Encyclopedia of Polymer Science and Technology", Volume 2, pages 1–91, Interscience Publishers (1965), which is hereby incorporated by reference.

Phenolplast resins, or phenol-aldehyde resins, are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make these phenolplast resins are phenol, o, m, or p-cresol, 2,4-xylenol, 3,4-xylenol, 2,5-xylenol, cardanol, p-tert-butylphenol, and the like. Aldehydes useful in this invention are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1–68, Interscience Publishers (1969), which is hereby incorporated by reference.

The blocked polyisocyanates useful in this invention are those which are stable in the dispersion systems at ordinary room temperature and which react with the polyhydroxypolyether resin at elevated temperatures.

In the preparation of the blocked organic polyisocyanate, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, and 1,4-naphthalene diisocyanates; the aliphatic-aromatic compounds such as 4,4'-diphenylene methane, 2,4- or 2,6-tolylene, or mixtures thereof, 4,4' toluidine, and 1,4-xylylene diisocyanates; the triisocyanates such as triphenyl methane-4,4'4''-triisocyanate, 1,3,5-triisocyanate benzene and 2,4,6-triisocyanate toluene; and the tetraisocyanates such as 4,4'-diphenyl-dimethyl methane-2,2',5,5'-tetraisocyanate; the polymerized polyisocyanates such as tolylene diisocyanate dimers and trimers, and the like.

In addition, the organic polyisocyanate can be a prepolymer derived from a polyol such as glycols, e.g., ethylene glycol and propylene glycol, as well as other polyols such as glycerol, trimethylolpropane, hexanetriol, pentaerythritol, and the like, as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, triphentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic aromatic alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as, phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol. Additional blocking agents include tertiary hydroxyl amines, such as diethylethanolamine and oximes, such as methylethyl ketoxmine, acetone oxime and cyclohexanone oxime.

The blocked polyisocyanate is formed by reacting a sufficient quantity of blocking agent with the organic polyisocyanate to insure that no free isocyanate groups are present.

If the aminoplast or phenolplast resin is added during the dispersion process, it can be water soluble or water insoluble. If post-added, water soluble resins can be added simply by blending and dissolving them into the aqueous dispersion medium. Water insoluble resins can be added to the dispersions as an aqueous dispersion. Aminoplast and phenolplast resins are utilized in the amount of about 5 to about 40 percent by weight based on the weight of the polyhydroxy polyether resin. The blocked polyisocyanate can be added during the dispersion process or post-added as a dispersion. The blocked polyisocyanates are utilized in the amount of about 0.5 to about 2 urethane groups for each hydroxyl group of the polyhydroxypolyether resin.

The aqueous dispersions of complex polyhydroxy polyether resins used in this invention are prepared by mixing at a temperature of about 50° C. to about 120° C. the resin with water having dissolved or dispersed therein an anionic or nonionic dispersant, agitating the mixture to form a dispersion having a particle size of about 1 to about 50 microns, and cooling the dispersion below the melting point of the resin. In one variation of this process, the complex polyhydroxy polyether resin is heated to its molten stirrable state, an aqueous solution of the dispersant is slowly added to the molten resin with agitation, agitation is continued until a dispersion of the desired particle size is obtained, and the dispersion is then reduced with water to the desired solids content and cooled. If the softening or melting point of the resin is extremely high, a small amount, up to about 10 percent by weight, based on the weight of the resin, of a solvent for the resin can be added. Such solvents can be water soluble or water insoluble. Examples of such solvents are ethylene glycol monomethyl ether, ethylene glycol monoethyl ether, ethylene glycol monoethyl ether acetate, diethylene glycol monobutyl ether, xylene, toluene and the like. If the cross-linking agent is to be incorporated into the dispersion during the dispersion process, depending on the dispersing temperature and the reactivity of the crosslinking agent, it can be added at the molten resin stage, at the "taffy" stage, i.e., when water and molten resin are first mixed, or at any stage during the agitating and dispersing steps.

In another variation, the polyhydroxy polyether resin, either in molten form or crushed to a fine size, 8 to 20 mesh, U.S. Standard Sieve, can be slowly added to a heated (temperature range of about 50° C. to 120° C.) agitated aqueous solution of the dispersant. Agitation and heating are then continued until the desired particle size dispersion is obtained.

In still another variation, a small amount of the resin can be heated above its melting point and then "taffied" with water and dispersant. The remainder of the resin can then be added in crushed form, followed by heating and agitation to form the dispersion.

Complex polyhydroxy polyether resins can be prepared, as described in U.S. Pat. No. 2,615,007, by reacting epichlorohydrin with an aqueous solution of the sodium salt of a dihydric phenol. After the condensation and dehydrohalogenation reaction is completed, the salt of reaction is washed out by a "taffy" wash process. After all the salt is removed, the "taffy" is then heated to drive out the water and dry the resin. At the taffy stage, dispersant and water can be added to the "taffy" to form the dispersion of this invention, thus avoiding a costly drying step.

In order to operate at temperatures above the boiling point of water, the dispersion process can be conducted under pressure. However, it is preferred to carry out the reaction at atmospheric pressure and, therefore, at an upper temperature limit of 100° C.

In carrying out the dispersion process, the first stage of the dispersion, i.e., the stage before reduction to the final product, is conducted at a solids content of about 65 to about 82% by weight based on the total weight of the dispersion at that stage, and preferably at a solids conent of 75 to 80% by weight. After the desired particle size of the dispersion is obtained, the dispersion is reduced to a solids content, based on the total weight of the dispersion, below about 55% by weight. The lower reduction limit will vary depending upon the desired viscosity in the final product, the particle size of the dispersed phase, the presence or absence of protective colloid and the amount of protective colloid. Generally, the solids content is not reduced below 20% by weight. Preferably the solids content before formulation to the finished coating composition will vary between about 40 and about 50% by weight based on the weight of the dispersion.

In preparing the coating compositions of this invention, the aqueous dispersions hereinbefore described must be modified by the addition of a water immiscible alcohol, i.e., n-butanol, s-butanol, or iso-butanol. The preferred alcohol is n-butanol. The amount of butanol used in the coating compositions of this invention is about 5 to about 30 percent by weight of the total weight of the volatiles in the coating composition, and, preferably, about 8 to about 22 percent by weight. Coating compositions which contain butanol exhibit surface tension of 26 to 28 dynes/cm. at 25° C. Such coating compositions exhibit excellent metallic substrate wetting properties and produce continuous coatings which contain no voids. Surprisingly, other solvents, particularly water miscible solvents, which are well known coupling aids for aqueous dispersions and emulsions, do not reduce the surface tension of the aqueous dispersions used in this invention to the upper limit of 28 dynes/cm. and do not produce coating compositions which yield continuous films. Examples of such solvents and the surface tensions of the finished formulations using these solvents are:

| Water Miscible Solvent | Surface Tensions Dynes/cm. |
|---|---|
| Ethylene glycol monomethyl ether | 37.0 |
| Ethylene glycol monoethyl ether | 35.5 |
| Ethylene glycol monobutyl ether | 31.0 |
| n-Propanol | 29.5 |

Water immiscible solvents, other than the butanols, also failed to reduce the surface tension to the 28 dynes/cm. upper limit and failed to give good continuous films. Examples of such solvents and the surface tensions of finished formulations using these solvents are:

| Water Immiscible Solvent | Surface Tensions Dynes/cm. |
|---|---|
| Methyl Ethyl Ketone | 36.5 |
| n-Pentanol | 29.5 |
| n-Hexanol | 29.4 |

Mixtures of a butanol with another water immiscible solvent can be used provided at least half of the mixture is the butanol. For example, the use of a mixture of 54.7 weight percent n-butanol and 45.3 weight percent monobutyl ether of propylene glycol gave a surface tension of 27.5 dynes/cm. at 25° C. and continuous coatings with no voids.

The butanols cannot be added directly to the aqueous dispersion but must be added as an emulsion in water. If added directly, the dispersions will coagulate or form grit which makes them unsuitable for coating compositions. When added in the form of a suitable emulsion, the butanols do not cause coagulation or grit and do not lead to instability of the coating compositions. The butanols must be dispersed in water to particles sizes of less than 50 microns and the emulsions must be stable, i.e., they must not separate into phase layers, for at least ten minutes. The butanols are emulsified in water using high speed agitation and an anionic or nonionic surfactant or a mixture of anionic and nonionic surfactants. The emulsions generally will contain about 10 to about 60 weight percent butanol and about 0.2 to about 2 percent surfactant. The surfactants which can be used in the emulsions are the same as those described hereinbefore. Another useful composition which acts as a surfactant for the alcohols is the adduct of phosphoric acid and a glycidyl polyether of a polyhydric phenol salted with an amine.

Modification of the aqueous dispersion to the formulated coating composition is referred to, in the art, as "letting down" the dispersion, i.e., the dispersion is let-down or reduced in solids content and viscosity to the proper application properties. The components which are added in this modification are referred to as the "let-down" portion. In addition to the butanol emulsion, the let down can contain thickening agents or protective colloids as hereinbefore described, additional surfactant of the same kind and type as previously described as well as catalysts for the curing reaction between the polyhydroxypolyether resins and aminoplast or phenolplast resins or blocked polyisocyanates. Useful catalysts for the aminoplast or phenolplast resins are mineral acids and organic acids and their salts with amines. Such acids include p-toluene sulfonic acid, butyl acid phosphate, hydrochloric acid, phosphoric acid, sulfuric acid, maleic acid, phthalic acid and the like. A particularly preferred catalyst is an adduct of phosphoric acid and a glycidyl polyether of a polyhydric phenol as described in copending application, Ser. No. 703,030, filed July 6, 1976, now U.S. Pat. No. 4,059,550. The acid catalysts are used in the amount of about 0.1 to about 2 weight percent, calculated as the acid portion of the catalyst, based on the total solids weight of the coating composition, excluding any pigmentation.

Useful catalysts for the blocked polyisocyanate-polyhydroxypolyether resin reaction are the tin compounds, such as dibutyl tin dilaurate, dibutyl tin diacetate and dibutyl tin dichloride, as well as other catalysts for urethane formation well known in the art. The amount of catalyst used will vary from about 0.1 to about 4 weight percent based on the weight of the polyhydroxypolyether resin.

The amount of any additional surfactant and protective colloid will depend upon the end use of the coating composition and can readily be determined by anyone skilled in the art by routine experimentation. Such amounts will generally vary from about 0 to about 5 weight percent based on the total coating composition.

The additional components of the let-down portion can be added separately to the aqueous dispersion or can be mixed in with the butanol emulsion and added as one component.

The coating composition of this invention has a solids content of about 20 to about 45 weight percent based on the total weight of the composition. Such compositions are particularly useful as coating compositions for the interior of aluminum and steel cans and can be applied to the interior of said cans by airless spray application. The closures for such cans can also be coated with the compositions of this invention, such coatings being applied by roller coating processes. The coatings for cans are applied to dry film thicknesses of 0.1 to 0.5 mil and are cured by passing the metal through gas fired ovens heated to 600° to 800° F. in stages. The total residence time is these ovens is a matter of seconds, 5-10 seconds, with the coated metal temperature reaching 160°-200° C.

In other applications, i.e., as metal primer coatings, the coating compositions, are cured at temperatures of about 150° C. to about 300° C. for a time sufficient to obtain a cure. The coating compositions can be formulated into clear coatings as hereinbefore described or into pigmented coatings. Pigments can be added during the dispersion processing steps or can be added to the completed dispersion using well known formulating procedures. Other additives which can be incorporated in the coating compositions are coalescing solvents, leveling agents, wetting agents, dispersions of other resins, water soluble resins, thickening agents, suspending agents, surfactants, defoamers, and the like.

The following examples are presented to more clearly define the invention. Parts and percentages unless otherwise designated are parts and percentages by weight.

EXAMPLE 1

Part A

To a suitable reactor equipped with a mechanical agitator, thermometer, reflux condenser and dropping funnel were added 547 parts of diethylene glycol monobutyl ether. To the dropping funnel were added 120 parts of cumene hydroperoxide, 500 parts of styrene, 1200 parts of ethyl acrylate and 300 parts of methacrylic acid. The temperature in the reactor was raised to 132° C., and slow addition of the monomer-catalyst solution was begun. The addition was continued over a five hour period while holding the temperature at 132° C. After the addition was completed, heating at 132° C. was continued for about 5 hours until a conversion of monomers to polymers greater than 98% was obtained. Diethylene glycol monobutyl ether, 1778 parts, was then added followed by the slow addition of 362 parts of ammonium hydroxide (28% $NH_3$). After all the ammonium hydroxide was in, 304 parts of deionized water were added. The resulting resinous solution had a solids content of 39.14%, a Gardner-Holdt viscosity at 25° C. and at 39.14% solids of X-Y and a weight per gallon of 8.64 lbs.

Part B

To a suitable reactor were added 1135 parts of the diglycidyl ether of Bisphenol A having an epoxide equivalent weight of 187, 865 parts of Bisphenol A and 0.4 part of a 45% solution of potassium hydroxide in water. The reactor was flushed with nitrogen, agitation was begun and heat was applied. The temperature was raised to 320° F. where an exothermic reaction began. The temperature peaked at 445° F. in 8 minutes and was held at 390°-395° F. for about 7 hours until a constant viscosity, Gardner-Holdt viscosity at 25° C. of X-Y at 40% solids is diethylene glycol monobutyl ether, was obtained. The resulting phenol terminated polyhydroxypolyether resin had a melting point of 126° C. The resin was pulverized to a U.S. Standard Sieve mesh size of 8-20.

Part C

To a suitable reactor were added 794 parts of a protective colloid solution made from 1 part of Carbopol 940 water soluble resin obtained from B. F. Goodrich Chemical Company (a slightly cross-linked polyacrylic acid having an equivalent weight of 75, a specific gravity, of 1.41 and a pH of a 1% water solution of 3), 1 part of ammonium hydroxide (28% $NH_3$) and 98 parts of water. Also added were 507 parts of the surfactant described in Part A of this example. Moderate agitation was begun and heat was applied raising the temperature to 71° C. The slow addition of 3495 parts of the pulverized polyhydroxypolyether resin described in Part B of this example was begun at such a rate that no lumping occurred, a time period of about 90 minutes, while holding the temperature at 68°-73° C. After all the resin had been added, 40 parts of ammonium hydroxide (28% $NH_3$) were slowly added. The temperature was then raised to 94°-97° C., while increasing the agitation. Heating at 94°-97° C. with agitation was continued for about 5 hours until the particle size of the dispersed resin was reduced to below 3 microns. 20 parts of ammonium hydroxide were then added followed by 476 parts of hexamethoxymethyl melamine. After 10 minutes at maximum agitation, and at a temperature of 95° C., 3953 parts of deionized water were slowly added over a period of 25 minutes. The temperature was then lowered to about 50° C. and the dispersion was strained through 80 mesh nylon bags and filtered through a Cuno filter. The resulting dispersion had a solids content of 45%, a Ford #4 cup viscosity at 25° C. of 33 seconds, a pH of 9.2 and a weight per gallon of 9.03 lbs.

EXAMPLE 2

A coating composition was prepared from the polyhydroxypolyether resin dispersion of Example 1 by blending 53.87 parts of the dispersion of Example 1 with 12.50 parts of the 1% Carbopol 940 protective colloid solution described in Example 1 — Part C. The "let-down" portion, i.e., the portion of the coating composition which is added to the dispersion to produce a sprayable coating composition, was prepared by adding to a container with good agitation the following components in the order listed: 17.75 parts of deionized water; 2.5 parts of an aqueous solution (5 wt.%) of an anionic surfactant — the dioctyl ester of sodium sulfosuccinic acid (Aerosol OT from American Cyanamid Co.); 1.67 parts of an aqueous solution (15 wt.%) of a surfactant made by reacting 2 mols of polyethylene glycol having an average molecular weight of 6750 with 1 mol of the glycidyl ether of Bisphenol A having an epoxide equivalent weight of 468 using $BF_3$ catalyst; 1.78 parts of a catalyst solution, at 15% solids in water, of an adduct of 2 mols of phosphoric acid and 1 mol of a glycidyl ether of Bisphenol A having an epoxide equivalent weight of 674.5, prepared as described in Example A of copending application, Ser. No. 703,030, filed July 7, 1976; and 9.93 parts of n-butanol. The "let-down" components formed a stable emulsion, no separation after 4 hours, having a particle size of 1 to 10 microns. The "let-down" portion was added to the resin dispersion with stirring with no formation of grit. The coating composition so formed had a solids content of 25%, a viscosity, No. 4 Ford Cup at 25° C., of 15–20 seconds, a pH of 9–9.5 and a surface tension of 26.5 dynes/cm.

Films were cast from the coating composition onto untreated aluminum panels to a dry film thickness of 0.2 mil using a wire wound Meyer rod. After baking for 2½ minutes at 177° C., the films were well cured, uniform and glossy. The films showed no failure after 50 methyl ethyl ketone double rubs and passed the wet adhesion test 100%. No effect to the films was noted after heating the coated panels in water for 10 minutes at 82° C.

The inside of 12 ounce aluminum beer cans were then coated with the coating composition, using airless spray, to a dry film weight of 124–136 mg. per can. The coatings were cured by baking for 2 minutes at 204° C. The continuity of the coatings was determined by a conductivity test carried out by filling the coated can with a 10% solution of sodium chloride in water and then determining the milliamperes of leakage current through the coating 30 seconds after a potential of 12 volts is applied between the salt solution and the can exterior. High readings indicate defects in the coating, e.g., craters, voids, bubbles, etc., which in use could result in contamination of the can contents and/or corrosion of the container. A milliamp reading of less than 50 for a single coating of 124–136 mg. weight is commercially acceptable. The conductivity of the coatings was found to be from 9 to 22 milliamps.

The insides of 12 ounce aluminum beverage cans were then coated with the coating composition of this example using airless spray to a coating weight of 176 to 185 mg./per can. After being cured by baking for 2 minutes at 204° C., the conductivity was found to vary from 2 to 9 milliamps. Commercially acceptable conductivities for coatings of this film weight are less than 10 milliamps.

EXAMPLE 3

A coating composition was prepared using the same procedure described in Example 2 except no water immiscible butanol was used in the let-down portion.

To a suitable container were added with stirring 54.12 parts of the polyhydroxypolyether resin dispersion of Example 1, 0.05 part of Byk 069 Defoamer (Byk-Mallinckrodt Company), 0.05 part of Colloid 600 Defoamer (Colloids, Inc.) and 12.50 parts of the 1% Carbopol 940 protective colloid solution described in Example 1 — Part C.

The let down portion was prepared by blending 23.81 parts of deionized water with 2.5 parts of a solution (5% in water) of Aerosol OT surfactant, 1.97 parts of the phosphoric acid-glycidyl ether catalyst solution described in Example 2 and 5 parts of ethylene glycol monobutyl ether. The let-down portion was added to the resin dispersion forming a coating composition having a solids content of 25%, a viscosity, No. 4 Ford Cup at 25° C., of 15.3 seconds, a pH of 9.1 and a surface tension of 34.7 dynes/cm.

Films cast from the coating composition onto untreated aluminum panels to a dry film thickness of 0.2 mil were cured by baking for 2½ minutes at 177° C. The films were well cured, uniform and glossy. The films exhibited no failure after 50 methyl ethyl ketone double rubs, no wet adhesion failure and no effect after 10 minutes in water heated at 82° C.

The inside of 12 ounce aluminum beer cans were coated, by airless spray, with the coating composition to a coating weight of 124 to 136 mg. per can and the coatings were cured by baking at 204° C. for 2 minutes. The conductivity of the coatings exceeded 100 milliamps. When coated to coating weights of 176 to 185 mg. per can and cured in the same manner, the conductivity exceeded 100 milliamps.

EXAMPLE 4

A coating composition was prepared using the same procedure described in Example 2 except no water immiscible butanol was used in the let-down portion.

To a suitable container were added with stirring 62.67 parts of the resin dispersion described in Example 1, 0.06 part of Byk 069 Defoamer, and 9.63 parts of a thickener solution (15% in water) made by reacting 4 mols of polyethylene glycol having an average molecular weight of 6750 with 3 mols of the glycidyl ether of Bisphenol A having an epoxide equivalent weight of 480 using $BF_3$ catalyst. The let-down portion was prepared by blending 11.09 parts of deionized water with 2.89 parts of a 15% solution in water of Aerosol OT surfactant, 2.28 parts of the phosphoric acid-glycidyl ether adduct catalyst solution described in Example 2 and 11.38 parts of ethylene glycol monobutyl ether. The let-down portion was blended with the resin dispersion resulting in a coating composition having a solids content of 30%, a viscosity, #4 Ford Cup at 25° C., of 15–20 seconds, a pH of 9–9.5 and a surface tension of 32.5 dynes/cm.

Films cast from the coating composition onto untreated aluminum panels to a dry film thickness of 0.2 mil were cured by baking for 2½ minutes at 177° C. The films were well cured, uniform and glossy. The films exhibited no failure after 50 methyl ethyl ketone double rubs, no wet adhesion failure and no effect after 10 minutes in water heated at 82° C. The conductivity of coatings, coated on the inside of aluminum cans and cured as described in Example 2 was found to be 80 to 95 milliamps for coating weights of 124 to 136 mg., and 72 to 90 for coating weights of 176 to 185 mg.

EXAMPLE 5

Coating compositions were prepared using the same composition and procedure described in Example 4 except different organic solvents were substituted for the ethylene glycol monobutyl ether in the let-down portion. When xylene was used, the surface tension was 35.4 dynes/cm. Wetting of aluminum can surface was only fair with only fair film formation. The conductivity of such coatings was very high. The substitution of mineral spirits gave a surface tension of 34.4 dynes/cm., fair substrate wetting, fair film formation and high conductivity.

EXAMPLE 6

A coating composition was prepared using the same procedure described in Example 2 except a water soluble solvent and a small amount of water insoluble solvent, 2-ethylhexanol, plus a fluorocarbon surfactant were used in the let-down portion.

To a suitable container were added with stirring 61.88 parts of the polyhydroxypolyether resin dispersion of Example 1, 12.50 parts of the 1% solution in water of Carbopol 940 protective colloid described in Example 1 — Part C, 0.08 part of Byk 069 Defoamer and 9.99 parts of the thickener solution made from the reaction product of polyethylene glycol and glycidyl ether described in Example 4.

The let-down portion was prepared by mixing with agitation 12.62 parts of deionized water, 1.5 parts of a 5% solution in water of Aerosol OT surfactant, 3.15 parts of the phosphoric acid-glycidyl ether adduct catalyst solution described in Example 2, 0.12 part of Zonyl FSA fluorosurfactant (E. I. duPont de Nemours and Company) at 50% solids in isopropanol/water, 5.33 parts of ethylene glycol monobutyl ether and 0.67 part of 2-ethylhexanol. The let-down portion was blended with the resin dispersion portion forming a coating composition having a solids content of 30%, a viscosity, No. 4 Ford Cup at 25° C., of 21 seconds, a pH of 9–9.5 and a surface tension of 28.9 dynes/cm.

Films cast from the coating composition onto untreated aluminum panels to a dry film thickness of 0.2 mil were cured by baking for 2½ minutes at 177° C. The films were well cured, uniform and glossy. They exhibited no failure after 50 methyl ethyl ketone double rubs, no wet adhesion failure and very faint whitening after 10 minutes in water heated at 82° C. The conductivity of coatings, coated on the inside of aluminum cans and cured as described in Example 2 was found to be 70 to over 100 milliamps for coating weights of 124 to 136 mg. and 25 to over 100 milliamps for coating weights of 176 to 185 mg.

EXAMPLE 7

Part A

To a suitable reactor equipped as described in Example 1 — Part A were added 277.23 parts of ethylene glycol monobutyl ether. To the dropping funnel were added 47.08 parts of cumene hydroperoxide, 196.15 parts of styrene, 470.77 parts of ethyl acrylate and 117.69 parts of methacrylic acid. Ten percent of the monomer-catalyst mixture was added to the reactor and heat was applied raising the temperature to 110° C. The remaining monomer-catalyst mixture was then added over a 2.5 hour period with the temperature rising to 126° C. The temperature was held at 126° C. to 133° C. for 2 hours and 50 minutes for complete conversion of monomers to polymers. The resulting polymer solution had a solids content of 72%.

Part B

To a suitable reactor were added 1135 parts of the diglycidyl ether of Bisphenol A having an epoxide equivalent weight of 187, 865 parts of Bisphenol A and 0.4 L part of a 45% solution of potassium hydroxide in water. The temperature was raised to 160° C. The heat source was removed and the exothermic reaction raised the temperature to 230° C. The temperature dropped to 199° C. and was held at this temperature for 6 hours and 35 minutes until a constant viscosity as determined at 40% solids in diethylene glycol monobutyl ether was obtained, a Gardner-Holdt viscosity at 25° C. of X-Y. The resulting Bisphenol A terminated polyhydroxypolyether resin had a melting point of 126° C.

Part C

Using the same procedure as described in Example 1 — Part C, a dispersion was prepared from 43.3 parts of ethylene glycol monobutyl ether, 66 parts of the methacrylic acid copolymer solution described in Part A of this example plus 5.1 parts of aqueous ammonium hydroxide (28% NH$_3$) 193 parts of the protective colloid solution described in Example 1 — Part C, 850 parts of the polyhydroxypolyether resin described in Part B of this example, 15 parts of aqueous ammonium hydroxide (28% NH$_3$), 116 parts of hexamethoxymethyl melamine and 969 parts of deionized water. The resulting dispersion had a solids content of 45% and a particle size of 1–3 microns.

EXAMPLE 8

To a suitable container were added 53.87 parts of the polyhydroxypolyether resin of Example 7 and 12.5 parts of the Carbopol 940 aqueous solution described in Example 1 — Part C. The let-down portion was prepared in another container by mixing with good agitation 17.5 parts of deionized water, 2.5 parts of a 5% solution in water of Aerosol OT surfactant, 0.62 part of a 40% solution in water of the surfactant made from the polyethylene glycol and the glycidyl ether described in Example 2, 1.76 parts of a 15% solution in water of the phosphoric acid-glycidyl ether adduct catalyst described in Example 2, 6.10 parts of n-butanol and 5.15 parts of the monobutyl ether of propylene glycol. The let-down portion was added to the dispersion portion with stirring forming a coating composition having a solids content of 25%, a viscosity, No. 4 Ford Cup at 25° C., of 23 seconds, a pH of 9–9.5 and a surface tension of 27.5 dynes/cm.

Films cast from the coating composition onto untreated aluminum panels to a dry film thickness of 0.2 mil were cured by baking for 2½ minutes at 177° C. The films were well cured, uniform and glossy. They exhibited no failure after 50 methyl ethyl ketone double rubs, no wet adhesion failure and no effect after 10 minutes in water heated at 82° C. The conductivity of coatings applied to the inside of aluminum cans and cured as described in Example 2 was found to be 16 to 34 milliamps for coating weights of 124 to 136 mg. and 2 to 8 milliamps for coating weights of 176 to 185 mg.

EXAMPLE 9

A number of coating compositions were formulated as follows:

100 parts of the dispersion of Example 7 were blended until uniform with 23 parts of the 1% solution in water of Carbopol 940 described in Example 1 — Part C.

A let-down portion was prepared by combining in the order shown with stirring 1.12 part of a 40% solution in water of the ethylene glycol-glycidyl ether surfactant described in Example 2, 4.5 parts of a 5% solution in water of Aerosol OT surfactant, 29 parts of deionized water, 23.72 parts of different organic solvents as shown below, and 3.55 parts of a 15% solution in water of the phosphoric acid-glycidyl ether adduct catalyst described in Example 2. This let-down portion was then added to the vortex of the dispersion portion under agitation. The wetting properties of the coating compositions were determined by measuring surface tension and droplet spreading. The droplet spreading was determined by measuring the diameter to which a 12.5 mg. droplet of the coating composition spreads when placed on a panel of untreated aluminum. The following table shows the organic solvent used in the formulation of the let-down portion of the coating composition, the surface tension of the composition and the amount of droplet spreading.

TABLE

| Organic Solvent | Surface Tension (dynes/cm.) | Droplet Spreading (mm) |
|---|---|---|
| n-Propanol | 31.0 | 6.5 |
| sec-Butanol | 26.0 | 10.0 |
| iso-Butanol | 26.0 | 10.0 |
| n-Butanol | 26.0 | 10.0 |
| Ethylene Glycol Methyl Ether | 37.0 | 5.7 |
| Ethylene Glycol Ethyl Ether | 35.5 | 6.0 |
| Propylene Glycol Monobutyl Ether | 31.0 | 6.8 |
| Ethylene Glycol Butyl Ether | 29.5 | 7.2 |
| Methyl Ethyl Ketone | 36.5 | 5.8 |
| 54% n-Butanol / 46% Ethylene Glycol Monoethyl Ether | 29.5 | 6.0 |
| 54% n-Butanol / 46% Propylene Glycol Monobutyl Ether | 27.5 | 7.5 |
| n-Pentanol | 29.5 | 6.0 |
| n-Hexanol | 29.4 | 6.2 |

When used as coatings for the insides of cans by the procedures described in Example 2, the only compositions which exhibited acceptable conductivity values were those compositions which had surface tensions below 28 dynes/cm.

It is to be understood that the foregoing detailed description is given merely by way of illustration and that many variations may be made therein without departing from the spirit of the invention.

What is claimed is:

1. In a heat curable coating composition made from an aqueous dispersion of a complex polyhydroxy polyether resin derived from an epihalohydrin and a polyhydric phenol and having a melting point of at least 50° C. in admixture with an aminoplast or phenolplast resin or a blocked polyisocyanate and an anionic or nonionic surfactant or mixture thereof, the improvement which comprises using as a diluent in the dispersion an emulsion of a water immiscible butanol in water plus an anionic or nonionic surfactant or mixture thereof wherein the butanol is present in the amount of about 5 to about 30 weight percent based on the weight of the total volatiles in the coating composition and wherein the coating composition has a surface tension of about 26 to about 28 dynes per centimeter at 25° C.

2. The coating composition of claim 1 wherein the butanol is present in the amount of about 8 to about 22 weight percent based on the weight of the total volatiles in the coating composition.

3. The coating composition of claim 1 wherein the solids content is about 20 to about 45 weight percent.

4. The coating composition of claim 1 wherein the butanol is n-butanol.

5. The composition of claim 1 wherein the complex polyhydroxy polyether resin is the reaction product of epichlorohydrin and p,p'-dihydroxydiphenyl propane having a melting point of about 80° C. to about 135° C.

6. The composition of claim 1 wherein the butanol is incorporated as an emulsion in water having a particle size of less than 50 microns and is stable for at least 10 minutes.

7. In a process for preparing a heat curable coating composition made from an aqueous dispersion of a complex polyhydroxy polyether resin derived from an epihalohydrin and a polyhydric phenol and having a melting point of at least 50° C. in admixture with an aminoplast or phenolplast resin or a blocked polyisocyanate and an anionic or nonionic surfactant or mixture thereof, the improvement which comprises adding to the dispersion an emulsion in water of a water immiscible butanol and an anionic or nonionic surfactant or mixture thereof wherein the butanol is added in the amount of about 5 to about 30 weight percent based on the total volatiles in the coating composition.

8. The process of claim 7 wherein the butanol is present in the amount of about 8 to about 22 weight percent based on the weight of the total volatiles in the coating composition.

9. The process of claim 7 wherein the butanol is n-butanol.

10. The process of claim 7 wherein the butanol is added as an emulsion in water having a particle size of less than 50 microns and a stability of at least 10 minutes.

11. The process of claim 7 wherein the solids content of the coating composition is about 20 to about 45 weight percent.

12. The process of claim 7 wherein the complex polyhydroxy polyether resin is the reaction product of epichlorohydrin and p,p'-dihydroxydiphenyl propane having a melting point of about 80° C. to about 135° C.

* * * * *